Nov. 19, 1968     A. W. ERNESTUS     3,411,334
METHOD AND APPARATUS FOR ROLL-EXTRUSION OF SMALL TUBES
Filed Oct. 22, 1965     2 Sheets-Sheet 1
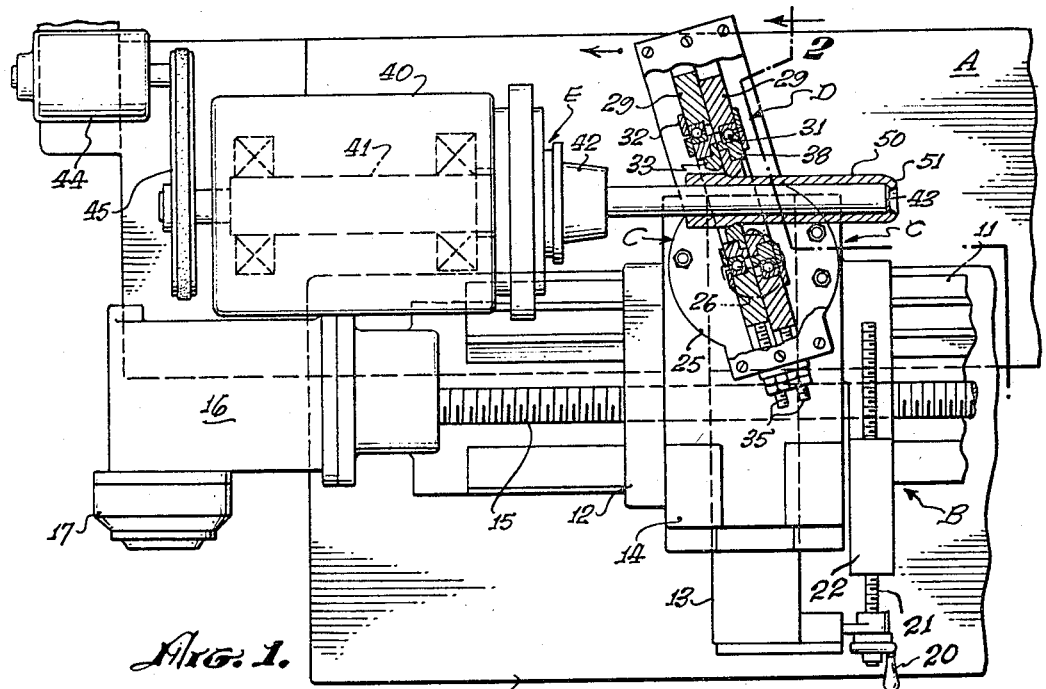
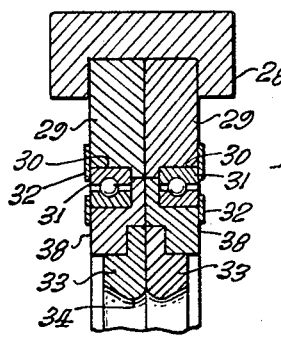
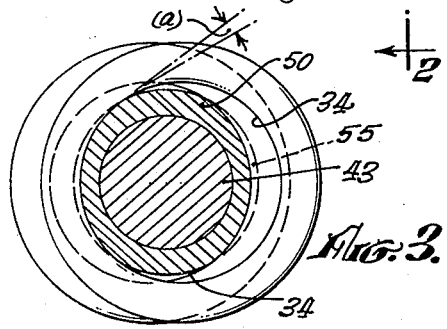
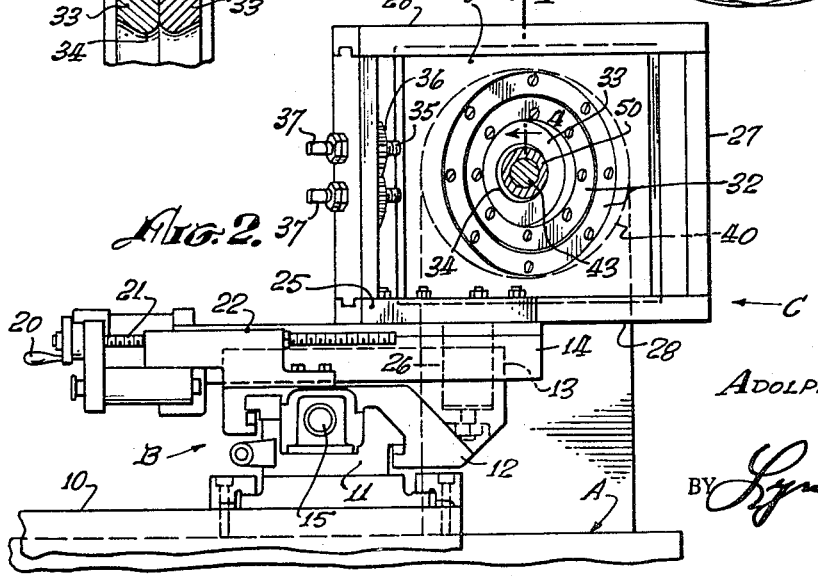
ADOLPH W. ERNESTUS,
INVENTOR.
BY Lynn W. Latta
ATTORNEY.

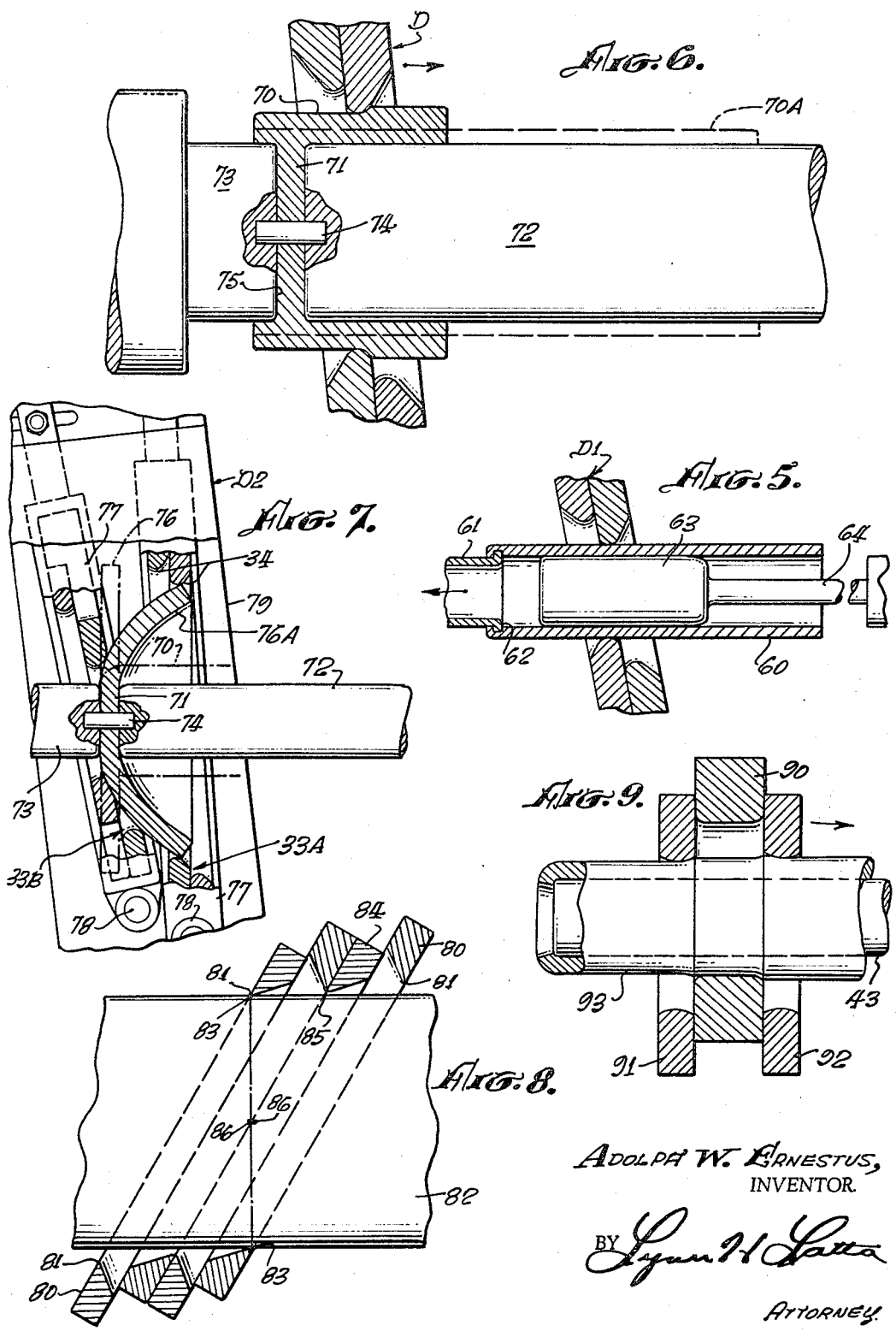

United States Patent Office 3,411,334
Patented Nov. 19, 1968

3,411,334
METHOD AND APPARATUS FOR ROLL-
EXTRUSION OF SMALL TUBES
Adolph W. Ernestus, Encino, Calif., assignor to N.T.W.
Missile Engineering Inc., Los Angeles, Calif.
Filed Oct. 22, 1965, Ser. No. 501,791
13 Claims. (Cl. 72—78)

ABSTRACT OF THE DISCLOSURE

External extrusive rolling of tubes over a mandrel by a balanced set of roller rings obliquely mounted in encircling large diameter anti-friction bearings which can be adjusted angularly about an axis that is radially related to the mandrel axis, so as to vary the obliqueness of the roller rings relative to the mandrel axis to maintain their balanced relationship when the rings are laterally moved.

---

This invention relates to the extrusive rolling of hollow, circular-sectioned bodies such as cylinders, cones and other hollow articles which may be either straight or configured in axial cross section, and relates particularly to external extrusive rolling of such hollow parts against a mandrel received therein and fitted to the internal wall of the part.

External rolling of cylinders and other tubular and annular parts upon mandrels, using male rollers engaging the peripheral surface of the part, has been practiced in the past, but without completely satisfactory success, due to the fact that such external rolling tends to expand the part circumferentially, making it extremely difficult and in most cases impossible to hold close tolerances in the diameter and true circular cross-section of the part. The action of a male or convex roller against the external surface of a part being rolled on a mandrel invariably develops circumferential expansion which destroys a closely fitted mating of the inner wall of the part with the mandrel and tends to cause the part to gap away from the mandrel and depart from true circularity. Thus, even though the finished part may appear to be round and approximately of the diameter determined by the mandrel, true conformity to the dimensions and the contour of the mandrel cannot be reliably attained.

The general object of the present invention is to provide a method and apparatus for external extrusive rolling of tubular and other annular parts on a mandrel with reliable accuracy and freedom from the aforesaid difficulties encountered in conventional external rolling. To this end, the invention povides a method and apparatus wherein an annular part is rolled:

(1) by a balanced set of female rollers encircling the part and rolling it against a mandrel with balanced rolling engagement with the external surface of the part;

(2) wherein the rollers have respective concave arcuate areas of rolling engagement which are extended circumferentially a substantial portion of the circumference of the part as contrasted to the substantially point contacts of male rollers in previous external rolling technique;

(3) wherein the direction of approach of the female rolling surface to the external surface of the part is of such low angle as it closes against the surface of the part, that it restraints the tendency of the tubular wall of the part to creep circumferentially ahead of the roller, thus restraining the tendency of the part to expand circumferentially; as contrasted to the high angle of approach of the periphery of the male roller against the external surface of the part in conventional mandrel rolling;

(4) wherein external extrusive rolling of a relatively short work piece into an elongated cylinder or other tubular part, on a mandrel, can be successfully and easily performed;

(5) wherein a cup-shaped part can easily be formed from a flat, circular blank by rolling it around the end of a mandrel and thence along the lateral wall of the mandrel with compressive contraction of the blank inwardly to the diameter of the mandrel;

(6) wherein a very high degree of unyielding stability of antifriction rotatable support of the forming rollers can be obtained by utilizing rollers of circular ring form and supporting them peripherally in large-diameter bearings;

(7) wherein balancing of one female roller against an opposed female roller, with exact diametral opposition of their areas of rolling contact with the work, can be obtained by mounting the rollers in adjacent planes which are disposed in skewed oblique relation to the mandrel axis;

(8) wherein such obliquely mounted rollers can be adjusted for operation on annular parts of various diameters by changing the angle of oblique mounting of the rollers with reference to the mandrel axis.

Other objects and advantages will become apparent in the ensuing specification and appended drawing in which:

FIG. 1 is a plan view illustrating one form of apparatus which can be utilized for performing the method of the invention, the female rollers and their mounting bearings and the annular work piece being shown in axial section;

FIG. 2 is an end elevational view of the same, with the mandrel and work piece being shown in section as indicated by the line 2—2 of FIG. 1;

FIG. 3 is a schematic face view of the female rollers viewed along their common axis and illustrating the areas of contact of the rollers against the work piece;

FIG. 4 is a detail sectional view of the roller mounting, taken on line 4—4 of FIG. 2;

FIG. 5 is a fragmentary sectional view of a modification of the invention with the rollers, the work piece and a pulling device shown in axial section;

FIG. 6 is a fragmentary sectional view illustrating the rolling of a part of cup-form utilizing another modification of the invention;

FIG. 7 is a fragmentary sectional view illustrating a variation of the cup rolling of FIG. 6;

FIG. 8 is a schematic diagram of a modified form of the rolling apparatus utilizing four rollers instead of two, and FIG. 9 is a sectional view of another modified form of the roller unit of the invention.

Referring now to FIGS. 1 and 2 in detail, I have shown therein, merely by way of example of an apparatus that can be utilized for performing the invention, a machine frame, designated generally at A, providing a support for a carriage assembly indicated generally at B, providing a longitudinally and transversely adjustable mounting for a tool mount C which is pivotally mounted on a vertical axis for angular adjustment of the planes of a pair of female work rollers units D rotatably supported in the mount C; the frame A also providing a support for a spindle assembly E including a mandrel, together with power means for rotating the mandrel.

The frame A supports a table or bed 10 having a longitudinal slide 11 providing parallel ways slidably supporting a longitudinal slide carriage 12 which in turn is provided with a transverse slide 13 on which is mounted a transverse carriage 14 having ways slidably coupled to slide 13. Longitudinal feeding movement of the carriage 12 on the slide 11 may be provided for by any suitable means, either by hydraulic actuator or by means of the feed screw indicated at 15. Screw 15 is driven through a gear box 16 by a feed motor 17 (FIG. 1).

Transverse movement of carriage 14 and slide 13 may be provided for by a suitable power driven feed device or by the illustrated hand crank 20, turning a feed screw 21 which is engaged in a nut 22 secured to longitudinal slide carriage 12.

Tool mount C comprises a base 25 which can be circular as indicated and which is pivotally mounted on a vertical pivot 26 suitably mounted in the carriage 14. Mount 25 further includes a rectangular frame 27 including horizontal ways 28 as its upper and lower members, the ways 28 being of channel section having rectangular grooves in which are mounted, for transverse sliding adjustment, in face-to-face contact with one another, a pair of bearing frames 29. Bearing frames 29 are provided with respective circular openings defined by counter bores 30 (FIG. 4) in which are mounted respective roller or ball-bearings 31, retained by retainer rings 32 of washer form, secured to the respective bearing mount rings 29.

Mounted within the bearings 31 are respective circular roller retainer rings 38 in which are mounted respective female rollers 33. Rings 38 are peripherally counterbored to receive the inner races of bearings 31 and are secured thereto by inner retainer washers 32, attached to rings 38. Each roller 33 has a lip 34 of toroidally-curved form for rolling engagement with the work piece.

Roller mount frames 29 are provided with means for sliding adjustment thereof in the rectangular frame 27 in order to adjust their eccentricity to the mandrel axis. By way of illustration of a simple manual form of adjustment that can be utilized, I have shown a pair of adjusting screws 35 which are threaded into respective roller frames 29 and are geared together by spur gears 36 (FIG. 2) so as to turn in opposite directions at the same rate of rotation, thereby adjusting one of the rollers 33 in one direction across the mandrel axis and simultaneously adjusting the other roller in the opposite direction across the mandrel axis, with both rollers being adjusted at the same rate of travel. The screws 35, or one of them, can be provided with suitable squared shanks 37 for engagement by cranks or wrenches for turning the screws.

The invention contemplates, in lieu of this manual adjustment mechanism, a motor driven adjusting mechanism operating under a conventional programing mechanism for continuously or intermittently varying the eccentricity of the rollers 33 in coordinated relation to the longitudinal feeding movement of the rollers along the length of the work piece so as to provide any selected longitudinal external contour in the work piece. Since apparatus for attaining such programed control of tool adjustment is well known in the machine tool art, the details thereof are not disclosed herein. For example, a tubular member having external annular strengthening ribs, axially spaced from one another, can be rolled by programed control of the apparatus of my invention, the rollers being moved apart sufficiently to leave the separated areas of the tubular work piece full diameter while rolling the intervening areas to thinner wall structure.

Spindle mechanism E comprises a suitable bearing head 40 in which is mounted a spindle 41 having a head 42 in which is supported a mandrel 43. Any suitable means for detachably coupling the mandrel 43 into the head 42 can be utilized. Spindle 41 is driven from a suitable motor 44 through a drive which can be a conventional belt drive as indicated at 45.

THE METHOD OF FIG. 1

In practicing the method as illustrated in FIG. 1, a tubular work piece 50 is preformed so as to fit closely over the mandrel 43 and is formed at one end with an inturned lip 51 for abutting engagement against the end of the mandrel as shown. The roller assembly is adjusted, by a longitudinal movement of slide 12, to a starting position where the roller lips 34 engage the end of the work piece adjacent the holding lip 51.

The mandrel is then rotated, transmitting rotation to the work piece 50, the rollers 33 are adjusted to correct positions of eccentricity to bite into work piece 50, and the roller assembly D is moved longitudinally along the work piece toward the head 42, thus extrusively rolling the work piece along the mandrel. The areas of rolling contact are diametrically opposed in a common plane normal to the mandrel axis and are thus balanced on opposite sides of the work piece. Referring now to FIG. 3, the areas of rolling contact illustrated in somewhat exaggerated proportion at 55, are of crescent shape and extend throughout substantial portions of the circumference of the work piece. Furthermore, the angle of leading contact of the roller with the work periphery, indicated at (a) in FIG. 3, is a relatively small angle due to fact that the concave internal contour of the roller is approximately shaped to the convex external contour of the work and is cradled thereagainst so that there is approximate conformity between the two contours, in contrast to the very broad angle of intersection of the leading side of the convex surface of a male roller, impressed into a convex surface of a work piece, and which tends to displace the metal circumferentially ahead of the male roller and thus to expand the work piece circumferentially.

It will now be apparent that as the roller frames 29 are slidingly adjusted transversely of the mandrel axis in order (e.g.) to narrow the diametral spacing between the opposed areas of rolling contact of roller rings 33 against the work tube, these rolling contact areas will be shifted not only radially toward the mandrel but also axially in opposite directions, due to the oblique movement of frames 29 in their obliquely disposed ways. The axial component of such adjustment would then result in unbalancing the rolling contact areas (offsetting them out of their common plane normal to the mandrel axis) if the angle of oblique setting of the common mount frame 27 were to remain unchanged. To maintain the balanced, diametrically opposed relation of the rolling contact areas, the base 27 can be "adjusted" on its pivot 26 to change the oblique angle of setting of frame until the rolling contact areas are again in balanced opposition.

Where the work piece is rolled along the mandrel away from the end thereof which is anchored to the mandrel (as by lip 51) the work will be extruded along the mandrel in the direction of movement of the roller assembly. This may be designated "forward extrusion". It will be understood, however that it is possible to abut the opposite end of the work piece against the spindle head 42 and again to move the roller assembly D toward the head 42, with the work being extruded out of the rear side of the roller assembly in the direction opposite from the movement of the roller assembly. This may be designated "backward extrusion."

MODIFIED FORM—FIG. 5

For extruding long cylindrical tubes, the invention contemplates a modified procedure wherein a work tube 60 is coupled to a traction device 61 by any suitable coupling means such as that indicated at 62, and is drawn axially over a fixed mandrel 63 supported on a stem 64 which can be of any selected length depending upon the length of the part to be extruded; and wherein the work tube 60 is drawn through a fixed roller assembly D1 which may be the same as the roller assembly D and its mounting, with the exception that it is fixed against movement longitudinally of the mandrel axis. Thus the mandrel and the roller assembly both are fixed while the work tube 60 is drawn axially through the roller assembly D1 in a manner broadly similar to the drawing of a tubular work piece over an internal extrusive rolling tool as disclosed in my Patent No. 3,222,905, issued Dec. 14, 1965.

CUP-FORMING—FIG. 6

FIG. 6 illustrates how my external rolling process can be modified so as to be applied to the rolling of the cylindrical wall 70 of a cup shaped part having a bottom 71 which can be abutted against the end of the mandrel 72, and held by being clamped between the mandrel 72 and a live center 73. For accurate alignment, a centering pin 74 can be extended through a central aperture in the work bottom 71 and into respective bores in the mandrel and the live center. The work rollers D are indicated fragmentarily and may be the same as the unit D of FIG. 1. The rolling operation is performed by starting at the bottom 71 and rolling the wall 71 along the mandrel 72 away from the bottom 71, as indicated by the arrow.

For some purposes the cup-shaped work part may require a dished depression 75 in its bottom 71. This can be accomplished by forging the bottom 71 utilizing the live center 73 as a punch, with the mandrel 72 functioning as an anvil. For this purpose it may be preferable to heat the work piece before the forging operation.

FIG. 7 discloses how the invention may be further modified so as to form a cup-shaped member from a work blank in the form of a plain flat disk 76 which can be circular or approximately circular, with a central aperture, by first clamping the blank 76 between the opposed ends of the mandrel 72 and live center 73 and then moving a modified roller assembly D2 axially against the blank 76, first engaging the blank near its periphery by a first stage pair of rollers 33A; then engaging this intermediate work shape (of smaller diameter than the original work blank 76) with a second stage pair of rollers 33B which are of correspondingly lesser radial spacing from the mandrel axis and may also be a smaller diameter as shown, and moving the second stage rollers 33B axially over the work to further reduce its diameter and to elongate the turned lateral wall portion thereof into the cylindrical lateral wall 70 along the lateral surface of the mandrel. The pairs of rollers 33B and 33A can each be approximately the same in design and arrangement and anti-friction peripheral support as the single pair of rollers 33 of FIG 1, with the exception that the lips 34 may all be nearer the same (e.g. trailing) sides of their respective rollers instead of the geometrically opposed or reversed arrangement of FIG. 1; and in each pair of rollers the diametrally-opposed, balanced condition is attained when the rollers have been adjusted radially inwardly to the positions where they are in extrusive rolling engagement with the cup wall 70 after it has been developed to its cylindrical form. Prior to this stage of development, the rollers may be arranged to engage the work blank (original flat disc and intermediate partially formed cup) individually in successive stages of engagement, although the rollers can be adjusted to establish substantially simultaneous balanced engagement with the work blank in an intermediate stage of forming (e.g. that shown in full lines in FIG. 7); or in some jobs where it may be advantageous, as where the metal is especially hard to form, the angles of oblique setting of the roller units 33A, 33B and the radial spacing of the rollers in one or both pairs may be continuously adjusted so as to maintain continuous balanced engagement of the rollers (of a pair, or of both pairs) against the work piece from the beginning of the operation starting with the flat work disc, throughout the cup forming operation. Accordingly, the respective pairs of rollers are mounted in individual mount frames 77 individually pivoted on separate pivots 78 for angular adjustment with respect to the mandrel axis, in a common housing 79.

As in the method of FIG. 1 the cylindrical wall 70 of the work can be further extruded along the mandrel and reduced to further wall thinness by successive passes of the second stage rollers 33B along the lateral wall 70 after adjusting them inwardly to closer spacing.

It will be understood that the number of stages of rolling for the forming method of FIG. 7 can be varied from two to more or less than two depending upon the dimensions and proportions of the work part to be formed and depending upon the characteristics of the metal being formed. For shallow cup-shaped members, it is possible, starting with a relatively small diameter flat disk blank, to form a shallow cup using a single set of rollers as in FIG. 5.

By the use of this modified cup-forming variation of the process, it is possible to form with extreme accuracy, an extremely deep cup form having a relatively thick bottom and a relatively thin lateral wall structure as indicated in phantom at 70A in FIG. 6, and by the beneficial work-hardening effects of the rolling to provide such parts of extremely high strength-to-weight-ratio. The part indicated at 70A in FIG. 6 is especially useful as a high-strength pressure vessel with integrated end head.

Referring now to FIG. 8 it is possible to utilize two pairs of forming rollers, namely an outer pair of rollers 80 for engaging the work cylinder 82 at diametrically opposite points 83, and an inner pair of work rollers 84 sandwiched between the outer rollers 80 and having immediately adjacent working lips 85 engaging the work at diametrically opposite points 86 angularly spaced ninety degrees from the points 83 (i.e. on a diameter normal to the plane of the drawing).

FIG. 9 discloses another modified arrangement of work rollers contemplated by the invention, wherein the rollers are disposed in planes normal to the axis of the mandrel 43. To provide a balanced arrangement of areas of rolling contact with the work, a relatively thick central roller 90 is interposed between a pair of outer rollers 91 and 92, the roller 90 engaging one side of the work piece 93, and the cylindrical internal work faces of the rollers 91 and 92 engaging the opposite side of the work tube 93, with the points of engagement of the rollers 91 and 92 located near the planes of the opposite faces of the intermediate roller 90. It also should be noted that the apparatus of FIG. 9 can further include either a means for mounting the rollers 90 and 91 in external bearings and for moving them axially along the work piece with the latter fixed to the mandrel as in FIG. 1; or by providing a fixed mounting of the rollers and a means for drawing the work axially over the mandrel as in FIG. 4.

In the roller assembly of FIG. 9, the roller 92 is a leading roller (with respect to the direction of relative movement between the work tube 93 and the roller asesmbly) and the roller 91 is a trailing roller. Extrusive reduction of diameter is provided for the operation of rollers 90 and 91 (the roller 90 working the tube 93 ahead of roller 91) and the roller 92 functions as an anvil opposed to roller 90 and is adjusted to the diameter of the work before its reduction by roller 90.

From results attained in the experimental use of the invention to date, I am satisfied that the process of this invention will effectively perform reduction of diameter to degrees of reduction and to wall thinness (while maintaining extreme dimensional accuracy and uniformity of work texture and strength factor) far beyond what has been possible by the use of any previous extrusive rolling process. Because of the extremely sturdy anti-friction mounting of the work rollers which is made possible by the invention, it is possible to apply much higher rolling pressures than with the use of previous methods and at the same time to hold the rollers rigidly in position with extremely infinitesimal deflections under the high reactive loads imposed on the bearings by the rolling operations. I also find that it is possible to greatly speed up the rate of movement of the rollers longitudinally along the work even while maintaining such extremely high working pressures. Furthermore, the large diameter of the internal working noses of the rollers distributes the wear and the heat generated in the rolling operation and correspondingly preserves the rollers for much longer operational life. Also, because of the large diameter bearing area of support of the work rollers, it is possible to achieve much higher degree of accuracy in maintaining the rollers operating in exact concentricity to their design axis of rotation.

I claim:

1. A method of extrusive external rolling of annular parts, comprising the following steps: positioning a workpiece in association with a mandrel for encircling engagement of the mandrel by the workpiece; utilizing a pair of female forming rollers disposed in adjoining relation in planes oblique to the mandrel axis, to apply radially inwardly and axially directed balance pressure to the workpiece at diametrically opposite spaced points, for rolling said workpiece against the mandrel; effecting relative rotation between the workpiece and the rolls; and simultaneously effecting relative axial movement between the rollers and the work piece whereby to effect extrusive external rolling of the work piece along the mandrel at said circumferentially spaced points, with said forming rollers in encircling relation to said workpiece adjusting the rollers transversely of the mandrel axis in said oblique planes, to vary the diametral spacing between the points of rolling contact between the rollers and the work piece; and varying the angle of said oblique planes relative to the mandrel axis, so as to maintain the diametrically opposed balanced relation between said points of rolling contact and the workpiece.

2. The method defined in claim 1, wherein rotary drive is transmitted through the mandrel to the work piece for effecting said relative rotation; and wherein said female rollers are of circular ring form and supported for live rotation in response to the rotation of the workpiece.

3. The method defined in claim 1, including the preliminary step of positioning a workpiece of disc form against an end of the mandrel, and applying axial pressure from said forming rollers to the area of said work piece projecting radially from the mandrel so as to draw it into tubular form around the mandrel.

4. The method defined in claim 1, including the initial step of positioning a work piece of preformed cylindrical form over the mandrel and within said forming rollers, and then adjusting said rollers to eccentric positions exerting radially inwardly directed pressure against said work piece at said diametrically opposite spaced points; and then effecting said relative axial movement while continuing said pressure so as to effect extrusive elongation of the work piece.

5. A method of extrusive external rolling of a tubular part comprising the following steps; supporting a tubular work piece on a mandrel extending therein; extending said work piece and mandrel through a pair of rotatable forming roller rings disposed in adjacent parallel planes oblique to the mandrel axis; engaging diametrically opposite points of said workpiece by opposed internal surfaces of said forming rings; and simultaneously effecting relative rotation and relative axial movement between said work piece and said forming rings while applying diametrically opposed radially inward pressure by said forming members against the work piece adjusting the rollers transversely of the mandrel axis in said oblique planes, to vary the diametral spacing between the points of rolling contact between the rollers and the workpiece; and varying the angle of said oblique planes relative to the mandrel axis so as to maintain the diametrically opposed balanced relation between said points of rolling contact and the workpiece.

6. The method defined in claim 5, wherein rotary drive is transmitted directly to said work piece, and wherein said forming rings are supported for live rotation and are permitted to rotate in response to the rotation of the work piece.

7. Apparatus for extrusive external rolling of tubular parts comprising: a mandrel; a pair of forming members of circular ring form having annular internal forming jaws adapted to encircle a tubular work piece receiving said mandrel and supported thereon; bearing frames supporting said forming members for rotation around said mandrel, for engagement of the periphery of said work piece by said jaws in balanced relation; a mount frame in which said bearing frames are slidably mounted for radial adjustment such as to exert balanced pressure against said periphery; means on which said mount frame is supported for angular adjustment such as to dispose the bearing frames at varying angles of obliqueness to the mandrel axis, whereby to establish and maintain a balanced relation of said forming members in which the points of contact between said jaws and the work piece are diametrically opposed in a common plane normal to the mandrel axis at varying radial spacing from said axis; means for effecting relative rotation between said work piece and said forming members; and means for simultaneously effecting relative axial movement between the work piece and the forming members whereby to effect extrusive external rolling of the work piece along the mandrel at said circumferentially spaced points.

8. Apparatus as defined in claim 7, wherein said bearing frames include anti-friction bearings in which said forming members are mounted for rotation, and carriage means supporting said mount frame supporting means for travel parallel to the axis of said mandrel.

9. Apparatus as defined in claim 7, wherein said means for transmitting relative rotation comprises means for rotating said mandrel and thereby rotating said work piece.

10. Apparatus for extrusive external rolling of tubular parts comprising: a mandrel; a plurality of female forming members having annular internal forming jaws adapted to encircle a tubular work piece receiving said mandrel and supported thereon; means supporting said forming members for rotation around said mandrel, for engagement of the periphery of said work piece by said jaws in balanced relation and for radial adjustment such as to exert balanced pressure against said periphery; means for effecting relative rotation between said work piece and said forming members; and means for simultaneously effecting relative axial movement between the work piece and the forming members whereby to effect extrusive external rolling of the work piece along the mandrel at said circumferentially spaced points; said means for transmitting relative rotation comprising means for rotating said mandrel and thereby rotating said work piece; said mandrel comprising sections axially aligned in end to end relation; and including means for transmitting rotation to one of said sections, live mounting means supporting the other section for free rotation, and means providing a separable connection between the abutting ends of said mandrel sections.

11. Apparatus as defined in claim 7, including a plurality of pairs of said female forming members respective mount frames in which the respective pairs of forming members are mounted for live rotation, and respective pivotal mounting for the respective mount frames, on which they are independently adjustable to respective oblique relationship to the mandrel axis.

12. The method defined in claim 1, wherein a flat work blank is secured to an end of the mandrel, wherein a first pair of said forming rollers is moved axially against a peripheral area of said work blank to form it into a flaring intermediate cup shape, and wherein a second pair of said forming rollers is moved axially against a more central area of said work blank, as thus formed into cup shape, and is utilized to reduce the diameter of the intermediate cup shape and to elongate the flaring wall portion thereof into a cylindrical tubular lateral wall.

13. Apparatus as defined in claim 7, including means interconnecting said bearing frames for equalized adjustment in unison toward and from the mandrel axis.

References Cited

UNITED STATES PATENTS

| | | | |
|---|---|---|---|
| 557,791 | 4/1896 | Findlay | 72—85 |
| 2,522,257 | 9/1950 | Curtis | 72—124 |
| 3,041,990 | 7/1962 | Le Fiell | 72—84 |
| 3,191,415 | 6/1965 | Sporck | 72—78 |
| 3,262,191 | 7/1966 | Albertson et al. | 72—85 |

RICHARD J. HERBST, *Primary Examiner.*